Nov. 7, 1967     D. R. BREWER     3,350,937
APPARATUS FOR MEASURING TANKFULS AND COUNTING THE SAME
Filed Jan. 8, 1965
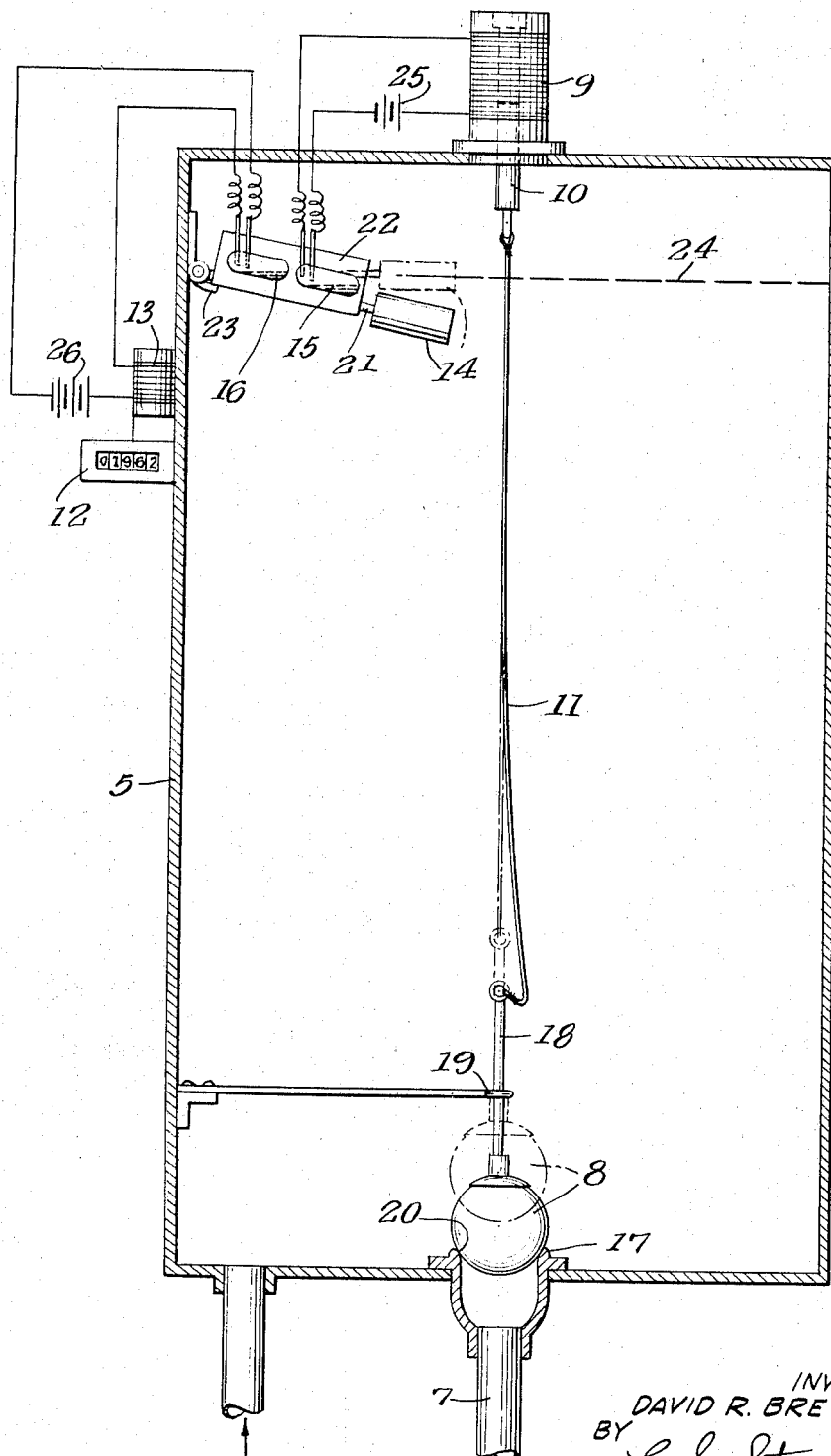
INVENTOR
DAVID R. BREWER
BY C. G. Stratton
ATTORNEY

United States Patent Office 3,350,937
Patented Nov. 7, 1967

3,350,937
APPARATUS FOR MEASURING TANKFULS
AND COUNTING THE SAME
David R. Brewer, 2345 Loma Vista St.,
Pasadena, Calif. 91104
Filed Jan. 8, 1965, Ser. No. 424,243
2 Claims. (Cl. 73—224)

This invention relates to means for measuring tankfuls and automatically counting the same, the invention, more particularly, dealing with measuring and counting tankfuls of oil, especially crude oil.

An object of the present invention is to provide simple and inexpensive means for measuring the gallonage in a flow that does not depend on flow meters or other devices that are subject to error for many causes, as line friction, changes of flow rates from place to place, etc., but rather collects the liquid in the flow in a tank of predetermined size and counts the tanks thus collected or filled to obtain the gallonage in terms of gallons or barrels, as desired.

Another object of the invention is to provide means as characterized above that is adapted to operate under low power supply so as to be safe in the handling of volatile liquids.

This invention also has for its objects to provide such means that are positive in operation, convenient in use, easily installed in a working position and easily disconnected therefrom, economical of manufacture, relatively simple, and of general superiority and serviceability.

The above objects are realized in apparatus that comprises a tank into which liquid is entered from beneath the same, having a gravity outlet that is controlled by a ball cock, the float of the latter mounting two normally open mercury or gravity switches that close when the float is raised by the liquid when the same reaches a predetermined level in the tank.

One of said switches closes a circuit to a solenoid that energizes, and its armature, connected to the ball float of the cock, retracts, to raise said ball from its seat so the tankful of liquid empties from the tank. The other switch closes a circuit to a solenoid that, when energized, operates a counter.

The ball float of the cock, when off its seat, is buoyant and remains buoyed upwardly while away from the seat from which it has been raised, so emptying of the tank may continue until the liquid has been drained. Upon closing of the outlet by drop of the ball float on its seat, the tank again fills and the above is repeated.

Both switches open as the float lowers at the beginning of liquid discharge, causing de-energization of both solenoids.

The outlet from the tank is preferably as large as or larger than the inlet. Therefore, the tank will empty. However, the amount of liquid discharged through the outlet is greater than the capacity of the tank, since such discharge includes the amount of liquid that entered the tank during discharge. Since this amount of liquid can be determined in advance, the amount of liquid discharged between the instant of raising the ball float and the instant of its closing can be determined in advance, and the parts set so as to obtain the same gallonage discharge each time the apparatus operates.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

The figure is a vertical sectional view of a tank provided with apparatus according to the invention, the view showing the electrical means of the apparatus in diagrammatic form.

The present apparatus comprises, generally, a tank 5 provided with an inlet 6 and an outlet 7, a buoyant ball 8 normally held closed by the liquid in the tank and, when raised to open the outlet, remaining so raised by its buoyancy until the tank is drained, a solenoid 9 having a floating core 10 that is normally projected and is retracted upon energization of said solenoid, a flexible connection 11 between the ball 8 and the core 10 to cause the former to be raised from closing the outlet 7 when said solenoid is energized, a counter 12 having an actuating solenoid 13 to record the number of times the tank is filled preparatory to emptying the same, a float 14 that is moved from one position to a raised position when filling of the tank is completed, a normally open mercury or gravity switch 15 carried by said float 14 to close an electrical circuit to the solenoid 9 when the float reaches its raised position, and a second and similar switch 16 carried by float 14 to close an electrical circuit to the solenoid 13 at the same time that solenoid 9 is energized.

The ball 8 seats on a fitting 17 to which the outlet 7 is connected. The same follows usual ball cock design in this respect and also in the provision of an extension 18 from the upper end of the ball 8 and a guide 19 that serves to loosely hold the ball 8 over the fitting 17 so the former may readily engage the seat 20 of said fitting to close flow.

The float 14 is shown as a hinged arm 21 on which a panel 22 is provided, the switches 15 and 16 being so mounted on said panel that the same are open when said arm 21 is gravitationally lowered onto a stop 23. It will be clear that upon the liquid entering the tank reaching a predetermined level 24, the float 14 will be buoyed up to a position in which both switches 15 and 16 automatically close.

It will be seen from the foregoing that each time the switches 15 and 16 are closed, gravitational discharge of the contents of the tank is instituted and the counter 12 is advanced one increment. When the level 24 lowers to a point at which the float 14 is downwardly angled, the switches 15 and 16 will automatically open. While the armature 10 will drop to cause slack in the connection 11, the ball 8, due to its buoyancy, will remain raised off the seat 20.

Emptying of the tank proceeds while additional liquid enters the tank. The inlet 6 being smaller than the outlet 7, the tank will eventually empty, the amount of liquid passing through the fitting 17 being the sum of the liquid of a full tank and the amount of such additional entering liquid, as above explained. When the tank can no longer buoy up the ball 8, the same will drop on its seat 20 to allow the tank to fill under pressure on the liquid in inlet 6.

The current sources 25 and 26 in the respective circuits to the solenoids 19 and 13 may come from any desired source. However, low voltage sources of dry batteries or diode-divided current in the low ranges of 6 v. to 22½ to 45 v. are deemed ample to safety control the action of the solenoids.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. Apparatus for measuring a quantity of liquid flowing through a tank having a bottom inlet that continues to conduct additional fluid at a constant rate to the tank while the tank is discharging the liquid therein, said apparatus comprising:

(a) a tank having a bottom outlet larger than the mentioned inlet and, when fully open, discharging liquid at a faster rate than liquid enters the tank from the inlet, (b) a buoyant ball normally seated upon and closing said outlet, said ball, when raised off the outlet, being buoyed by the liquid in the tank and retained unseated thereby, (c) a float near the top of the tank buoyed upwardly by the liquid in the tank when the same is at a high level, and gravitationally moving to a lowered position upon lowering of the liquid level, (d) two mercury switches mounted on said float, the same being open when the float is in lowered position, (e) a solenoid having a movable armature conncted to the ball and electrically connected in circuit with one of said switches to energize and cause the armature to retract and unseat the ball from the outlet when the float is raised by the level of liquid in the tank to cause said switch to close, and (f) means provided with an operating solenoid electrically connected in circuit with the other of said switches and operated upon energization of its solenoid when said second switch is closed upon raising of the float as mentioned to record the total number of opening operations of the ball valve for unloading of the fluid in said tank, (g) the inlet being directly open to the tank and continuing to conduct its flow at a constant rate to the tank during the time that the ball is unseated, thereby providing a simultaneous liquid discharge from and liquid fed to the tank.

2. Apparatus according to claim 1 in which the float is mounted to move back to its initial position wherein the two switches are open while the ball remains unseated from the outlet.

References Cited

UNITED STATES PATENTS

| 1,589,068 | 6/1926 | Givens | 73—224 X |
| 1,658,038 | 2/1928 | Budde | 73—224 |
| 2,966,798 | 1/1961 | Smith | 73—224 |

FOREIGN PATENTS

| 831,324 | 3/1960 | Great Britain. |
| 10,577 | 11/1923 | Netherlands. |

JAMES J. GILL, *Acting Primary Examiner.*

RICHARD C. QUEISSER, *Examiner.*

EDWARD D. GILHOOLY, *Assistant Examiner.*